(12) United States Patent
Koide et al.

(10) Patent No.: US 8,167,037 B2
(45) Date of Patent: May 1, 2012

(54) METHOD AND DEVICE FOR FEEDING LIQUEFIED CARBON-DIOXIDE GAS INTO AN AQUIFER DEEP UNDERGROUND

(75) Inventors: Hitoshi Koide, Tokyo (JP); Junji Shinoda, Tokyo (JP)

(73) Assignee: Mizuho Information & Research Institute Inc., Tokyo (JP)

( * ) Notice: Subject to any disclaimer, the term of this patent is extended or adjusted under 35 U.S.C. 154(b) by 175 days.

(21) Appl. No.: 12/667,675

(22) PCT Filed: Jul. 4, 2008

(86) PCT No.: PCT/JP2008/062223
§ 371 (c)(1),
(2), (4) Date: Feb. 19, 2010

(87) PCT Pub. No.: WO2009/008385
PCT Pub. Date: Jan. 15, 2009

(65) Prior Publication Data
US 2011/0017456 A1     Jan. 27, 2011

(30) Foreign Application Priority Data

Jul. 6, 2007 (JP) .................................. 2007-178331

(51) Int. Cl.
*E21B 28/00* (2006.01)
*E21B 43/16* (2006.01)
(52) U.S. Cl. .................... 166/249; 166/272.6; 166/275; 166/305.1; 166/400
(58) Field of Classification Search .................. None
See application file for complete search history.

(56) References Cited

U.S. PATENT DOCUMENTS

| | | | | |
|---|---|---|---|---|
| 3,794,114 A | * | 2/1974 | Brandon | 166/249 |
| 2007/0251686 A1 | * | 11/2007 | Sivrikoz et al. | 166/249 |

FOREIGN PATENT DOCUMENTS

| | | |
|---|---|---|
| JP | H 11-228122 | 8/1999 |
| JP | 2000-227085 | 8/2000 |
| JP | 2004-050167 | 2/2004 |
| JP | 2008-006367 | 1/2008 |
| WO | WO 2008/001812 | 1/2008 |
| WO | WO 2009/008385 | 1/2009 |

OTHER PUBLICATIONS

ISR published in WO 2009/008385, the international publication of this application.

* cited by examiner

*Primary Examiner* — Zakiya W Bates
(74) *Attorney, Agent, or Firm* — Neifeld IP Law, PC

(57) ABSTRACT

A method and system for feeding liquefied carbon-dioxide gas into the ground, by which liquefied carbon-dioxide gas can be efficiently permeated and diffused in a deep aquifer. The disclosed method for feeding liquefied carbon-dioxide gas into the ground includes the following steps:using a pumping well to pump up water from a deep aquifer to above-ground; creating injection water; applying pulsatile hydraulic pressure to the injection water; feeding the injection water to which pulsatile hydraulic pressure has been applied into the deep aquifer via an injection well; feeding liquefied carbon-dioxide gas—while maintaining carbon-dioxide gas in a liquefied condition—from a storage tank into the injection well to a depth having such pressure and temperature in which the liquefied condition can be maintained; mixing the liquefied carbon-dioxide gas—in the form of fine droplets—with the injection water, thereby generating a mixture of those two liquids.

8 Claims, 5 Drawing Sheets

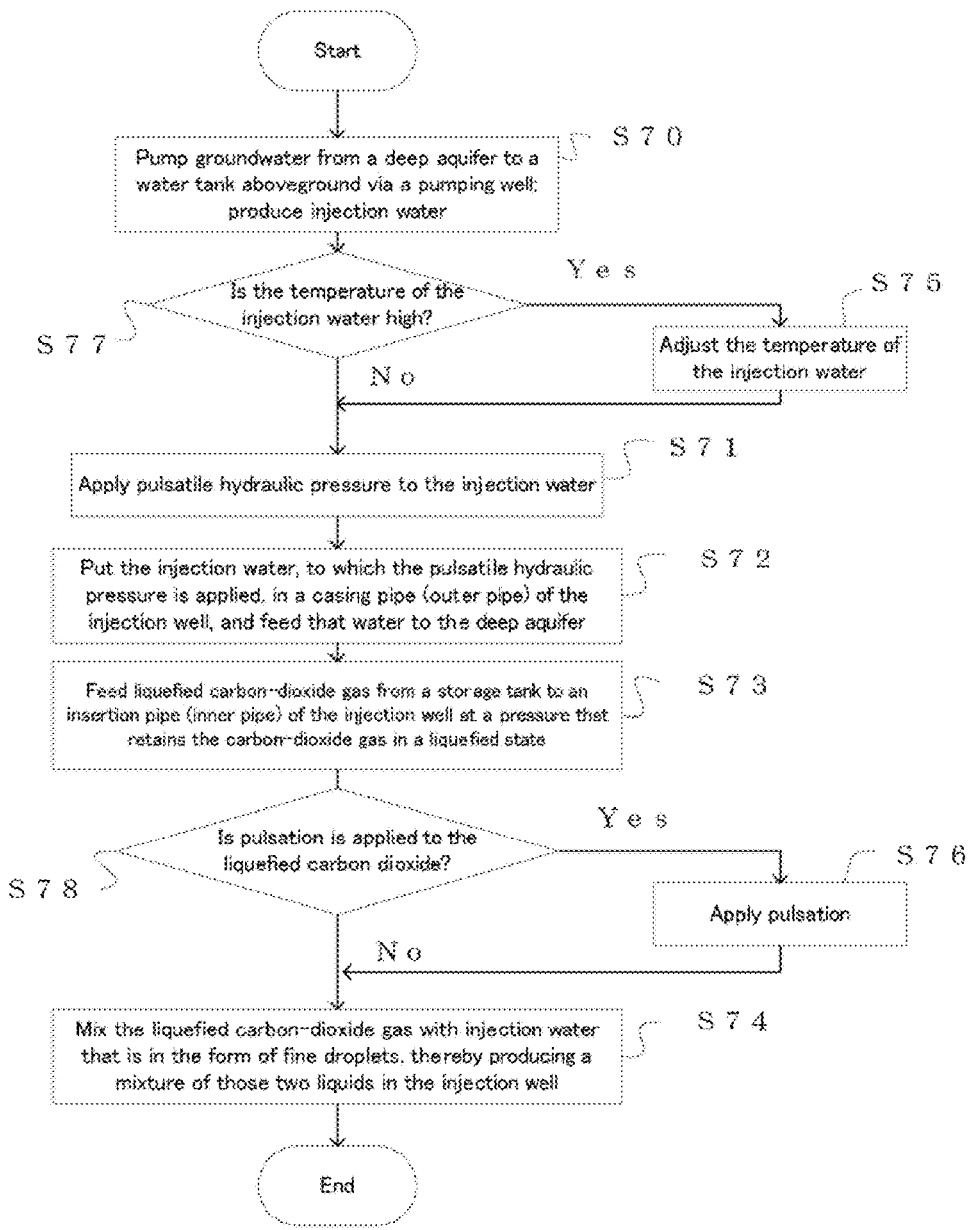

METHOD AND DEVICE FOR FEEDING LIQUEFIED CARBON-DIOXIDE GAS INTO AN AQUIFER DEEP UNDERGROUND

FIELD OF THE INVENTION

The present invention relates to a method and device by which liquefied carbon-dioxide gas is converted into fine droplets and mixed with injection water inside an injection well, so as to be able to be efficiently injected into an aquifer deep underground.

BACKGROUND OF THE INVENTION

The United States and the European Union have been making efforts to store carbon dioxide underground as an important measure for reducing greenhouse gases, which include carbon dioxide, methane, and hydrochlorofluorocarbon, with carbon dioxide constituting 90% or more of the greenhouse gases. When a large amount of carbon dioxide is injected into a deep aquifer in the form of a gas or supercritical liquid, it tends to solidify (as plume), which leads to low permeability or low diffusivity of the carbon dioxide. Carbon dioxide in the form of a gas or supercritical liquid is lighter than water, and therefore there is a risk that it will leak up to the surface of the ground. The amount of carbon dioxide being generated in the world is extremely large, and therefore there is desired a processing method that efficiently processes carbon dioxide so that said carbon dioxide has good permeability and diffusibility, and that can be fixed in a safe and sure manner underground even in a normal geological environment.

Patent Document 1, "Gas Liquefaction and Sedimentation Device," discloses that carbon dioxide, which is liquefied under a high pressure, and seawater are alternately pressure-fed deep into the sea. Patent Document 2, "Method for Feeding Liquid Carbon Dioxide into Deep Seawater," discloses that—utilizing liquefied carbon-dioxide gas, which is heavier than seawater—liquefied gas is released in shallow seawater in the form of liquid bubbles, and fed deep into the sea, maintaining a state of equilibrium. However, both of these documents refer to feeding of the gas into seawater, and do not disclose the permeability or diffusivity of the gas in case the gas is stored under the ground.

[Patent Document 1] Published Japanese Patent Document No. 2000-227085

[Patent Document 2] Published Japanese Patent Document No. H11-228122

DISCLOSURE OF THE INVENTION

[Problem to be Solved by the Invention]

One objective of the present invention is to provide a method for feeding liquefied carbon-dioxide gas into ground, by which liquefied carbon-dioxide gas can be efficiently permeated and diffused into a deep aquifer, and a device for feeding it into ground.

[Means for Solving the Problem]

To achieve the above-mentioned objective, the method of the present invention's claim 1 for feeding liquefied carbon-dioxide gas into the ground consists of the following steps:

creating injection water by using a pumping well to pump up water from a deep aquifer to aboveground, applying pulsatile hydraulic pressure to the injection water, feeding into the deep aquifer, via an injection well, injection water to which pulsatile hydraulic pressure has been applied, feeding liquefied carbon-dioxide gas, while maintaining said gas in a liquefied condition, from a storage tank into the injection well to a depth having such pressure and temperature in which the liquefied condition can be maintained, and mixing the liquefied carbon-dioxide gas—in the form of fine droplets—with the injection water, and thereby generating a mixture of those two liquids.

The invention described in claim 2 is the method described in claim 1, and further includes a step for applying low-frequency pulsatile hydraulic pressure to the liquefied carbon-dioxide gas that is fed into the injection well.

The invention described in claim 3 is a method as described in claim 1, and further includes a step for adjusting the temperature of the injection water.

A device, as described in claim 4, for feeding liquefied carbon-dioxide gas into the ground consists of a device to pump up water from a deep aquifer to aboveground in order to use the water as injection water, a high-pressure water-injection device for feeding the injection water into a deep aquifer from an injection well, a low-frequency-pulse generating device that is provided between the high-pressure water-injection device and the injection well and that applies pulsatile hydraulic pressure to the injection water, a high-pressure liquefied-carbon-dioxide-gas injection device for feeding liquefied Carbon-dioxide gas, while maintaining the liquefied carbon-dioxide gas's liquefied condition, from a storage tank into the injection well to a depth having such pressure and temperature in which the liquefied condition can be maintained, and a fine-droplet creating device that is provided inside the injection well and that transforms the liquefied carbon-dioxide gas that has been fed into the injection well into fine droplets, mixes the liquefied carbon-dioxide gas droplets with the injection water, and thereby generates a mixture of those two liquids.

The invention described in claim 5 is a device as described in claim 4, and is characterized in that the fine-droplet creating device includes a casing pipe into which the injection water is fed, an insertion pipe that is inserted into the casing pipe and into which the liquefied carbon-dioxide gas is fed, and a rotatable cylinder that is mounted inside and toward the bottom of the insertion pipe, with said rotatable cylinder having inside itself multiple injection pipes that inject the liquefied carbon-dioxide gas diagonally downward.

The invention described in claim 6 is the device described in claim 5, and is characterized in that a rotor that rotates due to a discharge flow of the liquefied carbon-dioxide gas is provided inside said rotatable cylinder.

The invention described in claim 7 is the device described in claim 5, and is characterized in that a submersible motor that rotates said rotatable cylinder is provided below the cylinder.

The invention described in claim 8 is the device described in claim 4, and further includes a low-frequency-pulse generating device that is provided between the device that applies pressure so as to feed liquefied carbon-dioxide gas device and the injection well, and that applies pulsatile hydraulic pressure to the liquefied carbon dioxide gas.

The invention described in claim 9 is the device described in claim 4, and further includes, between the water tank and the high-pressure water-injection device, a temperature-adjusting device that adjusts the temperature of the injection water.

EFFECTS OF THE INVENTION

According to the present invention's method, as described in claim 1, for feeding liquefied carbon-dioxide gas into the ground, the following are achieved.

(1) Liquefied carbon-dioxide gas that is pumped up from a deep aquifer is injected, in the form of fine droplets, into water, and therefore said liquefied carbon-dioxide gas can be widely diffused in a deep aquifer. Even if a phase change (change from droplets to bubbles) occurs depending on the pressure and temperature conditions in the deep aquifer, the buoyancy of fine bubbles is small, and therefore the fine bubbles do not rise up in stratums to become a large solid (plume).

(2) Also, fine droplets of carbon dioxide tend to enter into the gaps between particles of soil, and so they can easily be fixed in the ground.

(3) The injection water is subjected to low-frequency pulsation, and so the gaps in a stratum around an injection well are vibrated in a regular manner, and translational motions of the injection water and the fine droplets are activated. Therefore, the apparent fluidity of the fine droplets is improved.

(4) The droplet density of carbon dioxide is several hundred times larger than its bubble density, i.e., the volume of a droplet of carbon dioxide is smaller than the volume of a bubble of carbon dioxide, and therefore the fine droplets are injected into the stratum with better storage efficiency than when fine bubbles are so injected.

(5) The carbon-dioxide gas is made into fine droplets inside the injection well, and therefore the injection device does not need to be large, and natural hydrostatic pressure corresponding to the depth of the water in the injection well can be utilized.

claim 2 of the present invention includes a step for applying low-frequency pulsation to the liquefied carbon-dioxide gas that is fed into the injection well. As a result, the liquefied carbon-dioxide gas is made fluid, which makes the liquefied carbon-dioxide gas easy to inject. Accordingly, the mix rate (the ratio of fine droplets occupying a specified volume) can be made large, and so fine droplets can be produced efficiently.

According to claim 3, a step for adjusting the temperature of the injection water is provided, and therefore the pressure required for keeping the carbon dioxide in a liquefied condition can be reduced. That is to say, the burden on a pump can be reduced. Incidentally, it is desirable that the liquefied carbon-dioxide gas be fed from a liquefied-carbon-dioxide-gas injection device into an insertion pipe while maintaining the liquefied carbon-dioxide gas in a liquid phase at 30° C. or less and at a water pressure of 7 MPa (megapascals) or more. Underground water adjusted to a constant water temperature of 30° C. or less is used for the injection water, and the fine-droplet creating device is installed at a water depth having a pressure of 7 MPa or more. For this reason, the length of the insertion pipe is 700 m or more.

With the present invention's device as described in claim 4 for feeding liquefied carbon-dioxide gas into the ground, the same effects as those of claim 1 can be obtained.

According to claim 5 of the present invention, the fine-droplet creating device is mounted to the bottom of the insertion pipe, and therefore the fine droplets of the liquefied carbon-dioxide gas can be mixed with the injection water to produce a mixture of those two liquids inside the pressure injection well. In other words, the liquefied carbon-dioxide gas is injected from multiple rotating tubular injection pipes, and therefore, fine droplets can be efficiently produced.

According to claim 6 of the present invention, a rotor that rotates due to the discharge flow of the liquefied carbon-dioxide gas is provided inside the cylinder of the fine-droplet creating device, and therefore the liquefied carbon-dioxide gas can be swirled inside the cylinder. Also, the cylinder is rotated by a reaction force against the discharge of the liquefied carbon-dioxide gas from the injection pipes. The injection pipes are positioned where the rate of flow of the injection water is high. The higher the rate of flow is, the lower the pressure becomes, and the larger is the difference in pressure between the hydraulic pressure of the injection water and the liquid pressure of the liquefied carbon dioxide due to the device that applies pressure so as to feed liquefied carbon-dioxide gas into the injection well. Therefore, injection of the liquefied carbon dioxide is facilitated. As a result, fine droplets can be efficiently produced.

According to claim 7 of the present invention, a submersible motor is provided immediately below the cylinder of the fine-droplet creating device, and therefore the cylinder can be rotated at high speed. Power is supplied to the submersible motor from aboveground. The liquefied carbon-dioxide gas is injected from the injection pipes while the cylinder is rotating at a high speed, and therefore a larger amount of fine droplets can be produced.

According to claim 8 of the present invention, pulsation is applied to the liquefied carbon-dioxide gas by a low-frequency-pulse generating device, and therefore the liquefied carbon dioxide is made fluid, and thus the liquefied carbon dioxide is easily injected. As a result, fine droplets can be efficiently produced.

According to claim 9 of the present invention, a temperature-adjusting device for adjusting the temperature of the injection water is provided, and therefore the same effects as those of claim 3 can be obtained.

BRIEF EXPLANATIONS OF THE DRAWINGS

FIG. 7 is a flowchart showing the steps of the method for feeding liquefied carbon-dioxide gas into the ground (Embodiment 1).

EXPLANATIONS OF THE ALPHANUMERIC CHARACTERS USED IN THE DRAWINGS

Figure 1:
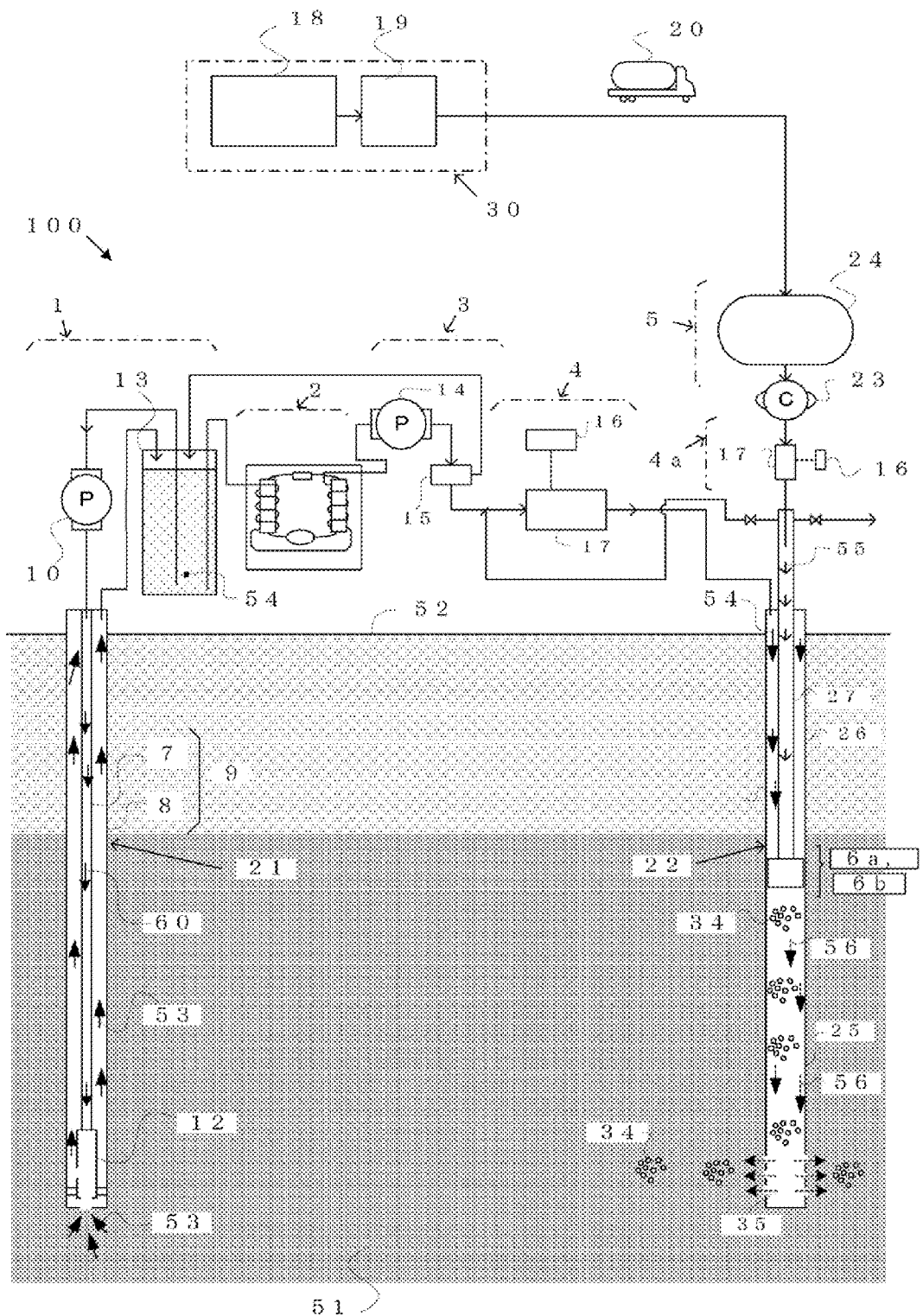
FIG. 1 shows the device for feeding liquefied carbon-dioxide gas into the ground (Embodiment 1).

1 pumping device
2 temperature-adjusting device
3 high-pressure water-injection device
4 low-frequency-pulsation generating device for liquefied carbon-dioxide gas
5 high-pressure liquefied-carbon-dioxide-gas injection device
6*a* fine-droplet creating device
6*b* fine-droplet creating device
7 inner pipe
8 outer pipe 9 double pipe
10 water pump
12 jet-suction part
13 water tank
14 high-pressure injection-water pump
15 pressure-adjusting valve
16 drive part
17 pulsation generator
18 incinerator
19 carbon-dioxide separation-and-recovery device
20 tanker
21 pumping well
22 injection well
23 compressor
24 liquefied-carbon-dioxide storage tank
26 casing pipe
27 insertion pipe
30 plant
31 submersible motor
34 fine droplet
35 slit
40 cylinder
41 injection pipe
42 triangular pyramid
43 rotor
44 vibration-prevention material
48 fixing fitting
51 deep aquifer
52 ground surface
53 groundwater
54 injection water
55 liquefied carbon-dioxide gas
56 two-liquid mixture
57 motor
58 oil hydraulic cylinder
59 rubber pipe
60 pressurized water
100 device for feeding liquefied carbon-dioxide gas into the ground
S70-S78 steps for processing liquefied carbon dioxide
L0, L1 depths
P0 hydraulic pressure at depth L0
P1 hydraulic pressure at depth L1
Pα hydraulic pressure of injection water
Pαd hydraulic pressure of injection water after pulsation
Pαdmax maximum pressure of pulsation of injection water
C, Cd constants (pressure)

BEST MODES FOR CARRYING OUT THE INVENTION

The present invention's method and device for storing liquefied carbon-dioxide gas in the ground will now be explained with reference to the drawings.
[Embodiments]
FIG. 1 shows an underground storage system that uses fine droplets of liquefied carbon-dioxide gas according to the present invention.
The device 100 for feeding liquefied carbon-dioxide gas into the ground in the form of fine droplets consists of
a pumping device 1 that pumps groundwater 53 from a pumping well 21 that reaches a deep aquifer 51,
a temperature-adjusting device 2 that adjusts the pumped groundwater 53 to a constant temperature in the range of 20° C.-25° C.,
a high-pressure water-injection device 3 that feeds the pumped groundwater 53—as injection water 54—into an injection well 22 that reaches the deep aquifer 51,
a low-frequency pulsation-pressure generating device 4 that is provided between the high-pressure water-injection device 3 and the injection well 22, and that applies pulsation pressure to the injection water 54,
a high-pressure liquefied-carbon-dioxide-gas injection device 5 that feeds high-purity carbon dioxide (separated and recovered from exhaust gas from an external plant 30 and/or from gas in a components-separating step in a chemical-reaction process)—in the form of liquefied carbon-dioxide gas 55—into the injection well 22, and
a fine-droplet creating device 6a or 6b that is provided at a depth where the hydrostatic pressure of the injection water in the injection well 2 is 7 MPa or more, and that mixes the liquefied carbon-dioxide gas 55 (in the form of fine droplets) with the injection water 54 so as to produce a two-liquid mixture 56.

The deep aquifer 51 refers to a stratum that is made of fine sand and saturated with saline water, and that is not suitable as a water resource for daily-living use by humans. The liquefied carbon-dioxide gas is injected to a depth of 700 m-1500 m. The liquefied carbon-dioxide gas 55 has a density almost identical to that of water, and is made into fine droplets in the injection water in the injection well 22 at a depth of 700 m or more. Some of the fine droplets are dissolved in the injection water 54. Others are not dissolved therein, and become the two-liquid mixture 56, maintaining the form of droplets that are then injected into the deep aquifer 51. The plant 30 includes a thermal power station, a waste incineration facility, a petroleum refining facility, a cement manufacturing facility, and a chemical plant. Incidentally, a large number of stratums exist between the ground surface 52 and the deep aquifer 51, but these are not shown in the drawings.

Under the usual pressure and at the usual temperature of a deep aquifer 51, 40 kg-60 kg of carbon dioxide can be dissolved in 1 $m^3$ (weight. 1000 kg) of water. When carbon dioxide is injected in the form of a supercritical liquid rather than as droplets, the carbon dioxide tends to go upward due to its buoyancy and to become a solid (plume). However, if liquefied carbon-dioxide gas 55 (in the form of fine droplets) is mixed with injection water 54, the liquefied carbon-dioxide gas 55 can be widely permeated and diffused in a deep aquifer 51 without becoming solid. The fine droplets 34 have an especially large contact area with groundwater 53. Therefore, the speed at which carbon dioxide in the form of fine bubbles—which, after permeation and diffusion, have changed into a gas phase due to the pressure and temperature conditions—is several hundred to several thousand times higher than that when carbon dioxide is in the form of gas or a mass of supercritical liquid underground. In addition, the fine droplets 34 go into the gaps between soil particles, and thereby the carbon dioxide is fixed. Therefore, this device is effective even in a deep aquifer where a seal stratum or a nonpermeable stratum does not exist above the aquifer 51.

Here, fixation of carbon dioxide occurs in the following way. The fine droplet-like carbon dioxide is adsorbed onto the surface of a rock mineral or is trapped in rocks as residual droplets due to a capillary effect exerted by such rocks. In contrast, carbon dioxide that has been made into fine bubbles due to changes in the pressure and temperature conditions tends to dissolve in peripheral groundwater. The dissolved carbon dioxide reacts with various kinds of ions and peripheral minerals that are abundant in the groundwater. For example, such dissolved carbon dioxide becomes ionized as shown in the following formula (1) and becomes more stable in the groundwater.

$$2CO_2 + 3H_2O + CaSiO_3 \rightarrow Ca^{2+} + 2HCO_3^- + H_4SiO_4 \qquad \text{Formula (1)}$$

Further, a reaction shown in the following formula (2) occurs. One-half of the $CO_2$ returns to the process shown by formula (1), but because $CaCO_3$ is a carbonate compound, the carbon dioxide, which has changed into $CaCO_3$, remains fixed almost permanently.

$$Ca^{2+} + 2HCO_3^- \rightarrow CaCO_3 + CO_2 + H_2O \qquad \text{Formula (2)}$$

The pumping device 1 includes
a pumping well 21 that includes a double pipe 9 that consists of an inner pipe 7 and an outer pipe 8,
a water pump 10,
a jet-suction part 12, and
a water tank 13.

In order to pump up groundwater 53, pressurized water 60 is fed to the inner pipe 7 using the water pump 10. The jet-suction part 12 generates a negative pressure by creating a high rate of flow of the pressurized water 60, and it sucks in groundwater 53 that is pumped up via the jet-suction part 12 and is stored as injection water 54 in the water tank 13. The groundwater 53 stored in the water tank 13 can be circulated and utilized as water to be poured into the water pump 10.

The groundwater 53 pumped up from the deep aquifer 51 is referred to as brine water, and is preferable as the injection water. Brine water contains a large amount of electrolytic ions, and its salt concentration is more than one-third of that of seawater. Therefore, brine water cannot be used by humans for drinking, cooking, or other daily-life purposes, and thus people living near where the device of this invention would be used will readily agree to brine water being used for this system. Aquifers containing brine water are widely spread in geological basins created during the third and fourth periods of the Cenozoic era. The mutual solubility (i.e., solubility of one liquid to be dissolved in another liquid) of liquefied carbon-dioxide gas is low, and the electrolytic ions in brine water further lower—in proportion to the electrolytic ions concentration—the mutual solubility of the liquefied carbon-dioxide gas (referred to as a "salting-out" phenomenon). Therefore, dispersion of fine droplets 34 can be prevented, and fine droplets can be produced at a high density.

A temperature-adjusting device 2 is provided between the water tank 13 and the high-pressure water-injection device 3, and it changes pumped groundwater 53 of 30° C. or more into water having a constant temperature within the range of 20° C.-25° C. When injection water 54 of 30° C. or more is fed into the injection well 22, the fine droplets 34 generated by the fine-droplet creating device 6a or 6b easily change from a liquid phase to a gas phase, and therefore it is important to control the temperature of the injection water 54. The temperature-adjusting device 2 produces injection water with a constant water temperature within the range of 20° C.-25° C. by cooling the groundwater by using a heat pump that utilizes the thermal energy of pumped groundwater whose temperature is 30° C. or more. When piping the injection water from the temperature-adjusting device 2 to the injection well 2 during summer or winter, it is preferable to take measures (such as embedding the piping under the ground, or providing the piping with a thermal insulator) to limit variations in the temperature of the piping.

The high-pressure water-injection device 3 includes
a high-pressure injection-water pump 14 for feeding injection water 54 to the injection well 22, and
a pressure-adjusting valve 15.

When the resistance against the pressure of the injection water 54 of the high-pressure injection-water pump 14 exceeds a certain level, the pressure-adjusting valve 15 opens to return the injection water 54 to the water tank 13. The distance between a pumping well 21 and an injection well 22 usually is 500 m-1 km, and so a water tank connected with a pipeline can be separately provided so as to be incorporated in the high-pressure water-injection device 2, apart from the water tank 13.

The low-frequency pulsation-pressure generating device 4 includes a drive part 16 and a pulsation generator 17. The drive part 16 is capable of specifying the frequency of the pulsation and the amplitude of the pressure. Pulsation is done at a low frequency; to be more specific, at a frequency of 0.5 Hz-30.0 Hz. Due to the low frequency, the pulsation is transmitted as far as the bottom of the injection well 22. The pulsation heightens the fluidity of the two-liquid mixture 56 in the stratum. Pressure injection efficiency is better under pulsation pressure than with static pressure only.

The plant 30 includes, as one example, a carbon-dioxide separation-and-recovery device 19 for separating and recovering carbon dioxide contained in exhaust gas from an incinerator 18. By chemical adsorption, the concentration of carbon dioxide can be 99% or more. A tank that temporarily stores carbon dioxide that has been separated and recovered as liquefied carbon-dioxide gas can be included.

The high-pressure liquefied-carbon-dioxide-gas injection device 5 includes a liquefied-carbon-dioxide-gas storage tank 24 and a compressor 23. Although not shown, a pressure adjusting valve, a flow rate meter, and a pressure meter are mounted on the high-pressure liquefied-carbon-dioxide-gas injection device 5. When the plant 30 is located near the injection well 22, carbon dioxide can be fed to the storage tank 24 through a pipeline. When the plant 30 is far from the injection well 22, carbon dioxide can be transported by a tanker 20. When carbon dioxide is transported by a tanker 20, the carbon dioxide is transported as liquefied carbon-dioxide gas under conditions of high pressure and low temperature.

When injecting the liquefied carbon-dioxide gas 55, it is necessary to continue feeding the liquefied carbon-dioxide gas 55 into the insertion pipe 27 while continuously maintaining a pressure of 7 MPa via the compressor 23, so as not to change the phase of the liquefied carbon-dioxide gas 55. Accordingly, when preparing to inject the liquefied carbon-dioxide gas 55, the piping path for feeding the liquefied carbon-dioxide gas 55 into the insertion pipe 27 of the injection well 22 is shut down by a valve, and the insertion pipe is filled with the injection water 54 via another water-injection piping path. Thereafter, the water-injection piping is closed, and the path into the insertion pipe 27 is opened. The liquefied carbon-dioxide gas 55 is fed at a predetermined high pressure, so that temporary reductions in the pressure of the liquefied carbon-dioxide gas are avoided. Depending on the inside diameter of the insertion pipe 27, all of the injection water 54 in the insertion pipe 27 can be pushed out through the fine-droplet creating device 6a or 6b in about 10 minutes, due to the liquid pressure of the liquefied carbon-dioxide gas 55. Then, the operation to create fine-droplets can be started. However, when the creation of fine-droplets is to be suspended for a long time, the valve of the piping path for feeding the liquefied carbon-dioxide gas 55 is closed, and the liquefied carbon-dioxide gas 55 in the insertion pipe 27 is evaporated via another piping path while lowering the liquid pressure in the insertion pipe 27 to atmospheric pressure, so that the carbon dioxide is recovered.

The low-frequency pulsation-pressure generating device 4a for liquefied carbon-dioxide gas is provided between the liquefied carbon gas pressure injection device 5 and the injection well 22, and said device 4a applies pulsation pressure to the liquefied carbon-dioxide gas 55. Pulsation of the liquefied carbon-dioxide gas 55 promotes creation of droplets from the fine-droplet creating device 6a (or 6b). The low-frequency pulsation-pressure generating device 4a includes a drive part 16 and a pulsation generator 17. The drive part 16 controls the period of pulsation and the amplitude of pressure. Pulsation is done at a low frequency of 0.5 Hz-30 Hz. This pulsation heightens the fluidity of the liquefied carbon-dioxide gas 55 and promotes injection from the fine-droplet creating device 6a or 6b.

The fined droplet device 6a or 6b is mounted to the bottom of the insertion pipe 27 and is installed at a water depth where the hydrostatic pressure of the injection water in the injection well 22 is 7 MPa or more. The injection water 54 is pressure-injected between a casing pipe 26 and the insertion pipe 27, and the liquefied carbon-dioxide gas 55 is pressure-injected in the insertion pipe 27. Droplets are produced by the fine-droplet creating device 6a and are fed—as the aforementioned two-liquid mixture—into the deep aquifer 51 through slits 35 at the bottom side of the casing pipe 26. A vibration-preventing material 47 is provided to the insertion pipe 27, and a fixing fitting 4 is provided to the casing pipe 26.

The fine-droplet creating device 6a in Constitution Example 1 has a structure such that the discharge flow of the liquefied carbon-dioxide gas 55 rotates a rotor 43 mounted on the inside of a cylinder 40, and such that a reaction force against the injection of the liquefied carbon-dioxide gas 55 from the injection pipe 41 rotates the cylinder 40. The rotation speed of the fine-droplet creating device 6a is about 100 rpm-1000 rpm, depending on the number of injection pipes provided on the side of the cylinder 40, the diameter of the injection pipes, and the liquid pressure of the liquefied carbon-dioxide gas 55. The droplets produced under this rotation speed range in diameter from 0.01 mm to 1 mm, which means that droplets having a diameter slightly larger than 1 mm exist. However, if droplets are injected into a deep aquifer of 700 m-1500 m, they do not change into a large mass of gas, even if droplets having a diameter slightly larger than 1 mm change into bubbles due to changes in the pressure and temperature. Therefore, carbon dioxide can be safely fixed in the deep aquifer 51.

The fine-droplet creating device 6b in Constitution Example 2 has a structure such that the fine-droplet creating device 6b is rotated at a high speed by a submersible motor 31. The rotation speed of the fine-droplet creating device 6b is about 1000 rpm-3000 rpm, and the droplets produced by high-speed rotation have diameters in the range of 0.01 mm-0.05 mm. Constant and fine droplets are produced, and therefore this device is effective even where, for example, the depth of the water in the deep stratum 51 is only several dozen meters.

As shown in FIG. 1, while the fine droplets 34 move toward the slits 35 at the bottom of the injection well 22a, the hydraulic pressure of the line droplets 34 becomes high, and the pressure inside the droplets also increases. When the temperature and pressure become, for example, 31.1° C. or more and 7.382 MPa near the slits 35 at the bottom of the injection well 22 due to the high geothermal heat near the injection depth of the deep aquifer 51, the fine droplets change their phase to fine, supercritical liquid particles. The present invention achieves such change of phase to fine, supercritical liquid particles. The position and injection depth of the injection well 22 can be decided according to the site conditions (i.e., geographical structure, pressure, and temperature) of the deep aquifer 51 and the phase change of the droplets 34.

Figure 2:
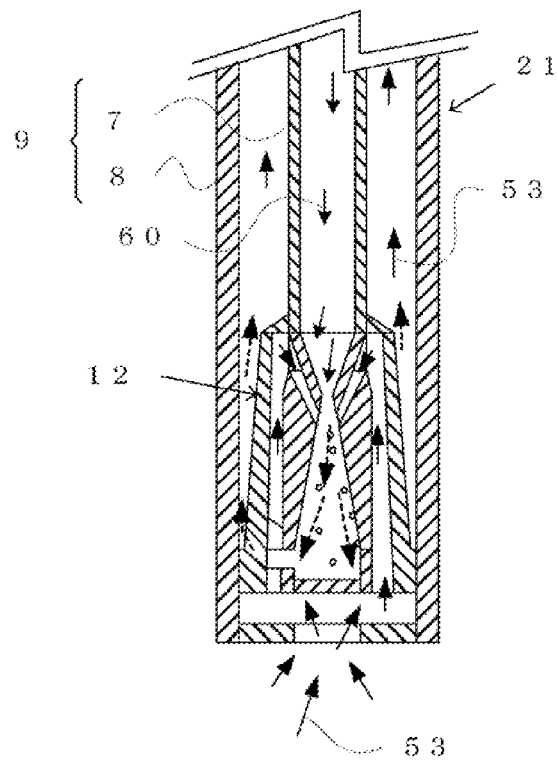
FIG. 2 is a cross-section view of the double pipe of the pumping well (Embodiment 1).

FIG. 2 is a cross-section of the double pipe of a pumping well. A jet-suction part 12 has an inverted-funnel shape for increasing the rate of flow of the pressurized water G0 from the inner pipe 7. The inside of the inverted funnel-shape is under a negative pressure, and therefore groundwater 53 is sucked in. The sucked groundwater 53 goes upward inside of the outer pipe 8, which is outside of the inner pipe 7.

Figure 3:
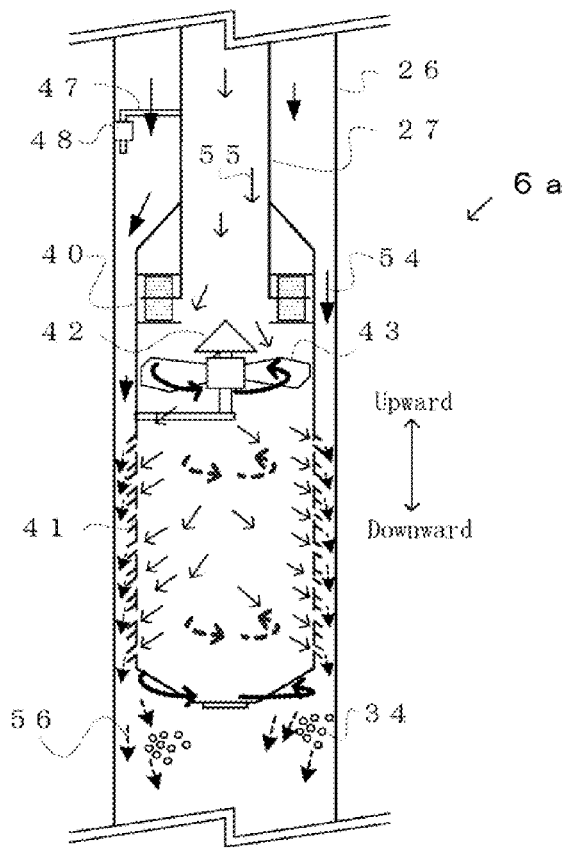
FIG. 3 is a cross-section view of the fine-droplet creating device (Constitution Example 1 of Embodiment 1).

FIG. 3 is a cross-section of a line-droplet creating device (Constitution Example 1) consisting of a cylinder 40, a rotor 43 provided on the inside and at the top of the cylinder 40, and multiple injection pipes 41 projecting diagonally downward on the inside of the cylinder 40.

The cylinder 40 can be, for example, rectangular, which gives a stronger swirl flow to the injection water 54 than a circular cylinder does, and therefore a rectangular cylinder creates finer droplets. The liquefied carbon-dioxide gas 55 from the insertion pipe 27 is poured into the periphery of the cylinder 40 by a triangular pyramid 42, and the flow of the liquefied carbon-dioxide gas rotates the rotor 43 and swirls the liquefied carbon-dioxide gas 55. Furthermore, the liquefied carbon-dioxide gas 55 is injected downward along the inside of the casing pipe 26 from the injection pipes 41, and therefore, the cylinder 40 rotates by a reaction force against the injection. The liquefied carbon-dioxide gas 55 injected from the injection pipes 41 is made into droplets that are mixed with the injection water 54, whose flow rate is made high, forming a two-liquid mixture 56. Also, to prevent deformation of the invention pipe 27 by vibrations that result when the fine-droplet creating device 6a rotates, a vibration-prevention material 47 is attached to the insertion pipe 27 at two places and is inserted into and fixed to a hole of a fixing fitting 48 that is welded on the inside of the casing pipe 26.

Figure 4:
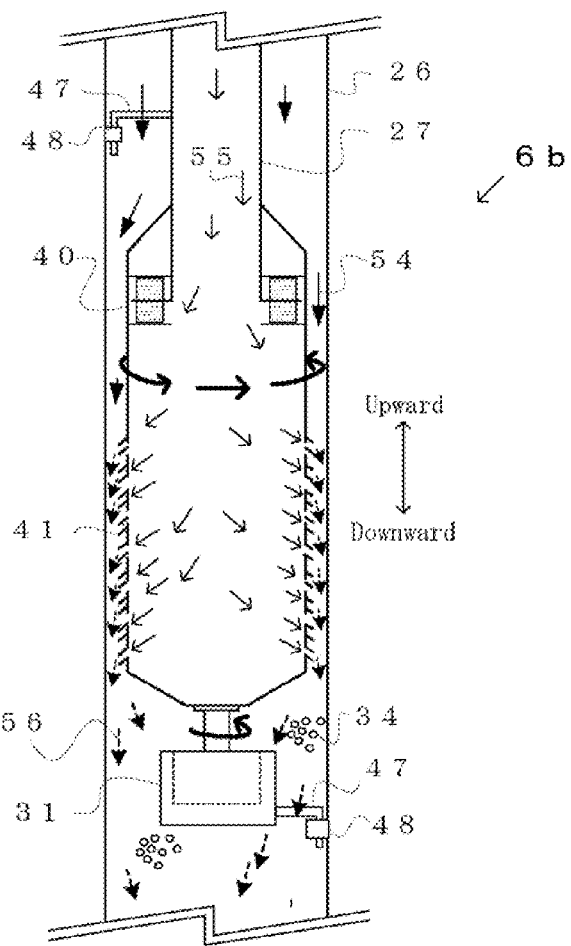
FIG. 4 is a cross-section view of a second fine-droplet creating device (Constitution Example 2 of Embodiment 1).

FIG. 4 is a cross-section of a fine-droplet creating device 6b (Constitution Example 2), which consists of a cylinder 40 and multiple injection pipes 41 projecting diagonally downward on inside the cylinder 40.

If the cylinder 40 is a rectangular cylinder, a stronger swirl flow is given to the injection water 54 than a circular cylinder does, and therefore the droplets can be made finer. A submersible motor 31 provided immediately below the cylinder 40 rotates the fine-droplet creating device 6b at a high speed. The submersible motor 31 is driven by power supplied from the ground level. The liquefied carbon-dioxide gas 55 that is injected from the injection pipes 41 is made into droplets and mixed with the injection water 54, whose flow rate is made high, thereby forming the two-liquid mixture 56. Also, to prevent deformation of the invention pipe 27 by vibrations that result when the Fine-droplet creating device 6a that is mounted to the bottom of the insertion pipe 27 rotates, a vibration-prevention material 47 is attached to an insertion pipe rod at the lowermost end at two places, and the hooks of the vibration-prevention material 27 are inserted into and fixed to holes of the fixing fittings 48, which are welded to the inside of the casing pipe 26.

In the two-liquid mixture 56, solidification of bubbles does not occur, unlike what occurs with a gas-liquid mixture. The purpose of the pulsation used for injecting the two-liquid mixture 56 is to pulsate the two-liquid mixture 56 into gaps of the stratum to which the fluid is fed, to feed the fine droplets 34 more widely than occurs in the case of static injection, and to improve the injection efficiency.

Figure 5:
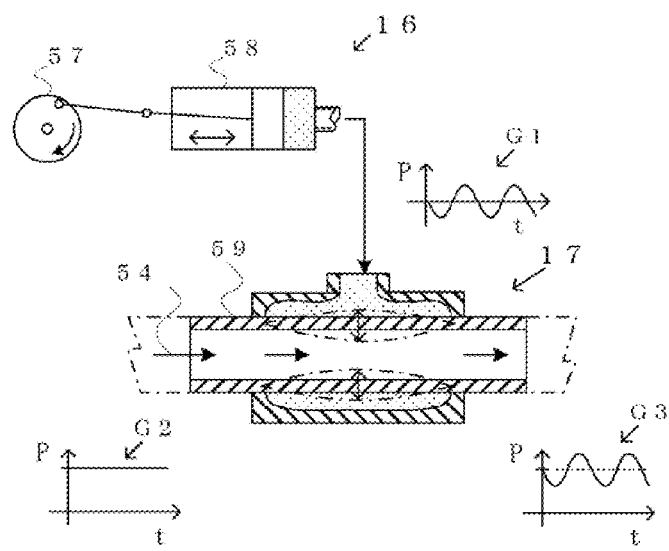
FIG. 5 is a constitution view of the low-frequency-pulsation generating device (Embodiment 1).

FIG. 5 is a view of the low-frequency-pulsation generating device 3. The drive part 16 consists of, for example, a motor 57 and an oil hydraulic cylinder 58. When the motor 57 rotates, the piston of the oil hydraulic cylinder 58 moves, and oil hydraulic pressure is applied at a constant cycle as shown by G1. This oil hydraulic pressure expands or shrinks the diameter of a rubber pipe 59 of the pulsation generator 17. The magnitude of the oil hydraulic pressure can be controlled by providing an electromagnetic valve at the outlet of the oil hydraulic cylinder 58 so as to release pressure. Assuming that the rotation speed of the motor 57 is 1.200 rpm, there are 20 cycles/second (i.e., 20 Hz). As shown by G2, pulsation is applied to the injection water 54, as a result of which the pressure of the injection water 54 from the pressure-injection pump 12 becomes as shown in G3. Also, a check valve can be provided upstream of the low-frequency-pulsation generating device 3, so as not to transmit pressure under a high-load condition. The amplitude of the pulsation can be, for example, as expressed by the following formula:

$$(P\alpha - 0.5P\alpha) < P\alpha d < (P\alpha + 0.5P\alpha)$$

where
the hydraulic pressure of the injection water 54 is $P\alpha$,
the hydraulic pressure after pulsation is $P\alpha d$, and
the coefficient of the amplitude is 0.5.

It is desirable that the $P\alpha$ be 10 kg/cm$^2$-30 kg/cm$^2$. Also, the normal pulsation frequency is 0.5 Hz-30 Hz. To strengthen the permeating force of pulses so that they reach as widely as possible, this system's pulsation frequency is 10 Hz or less, at which the permeating force of pulses is strong.

Figure 6:
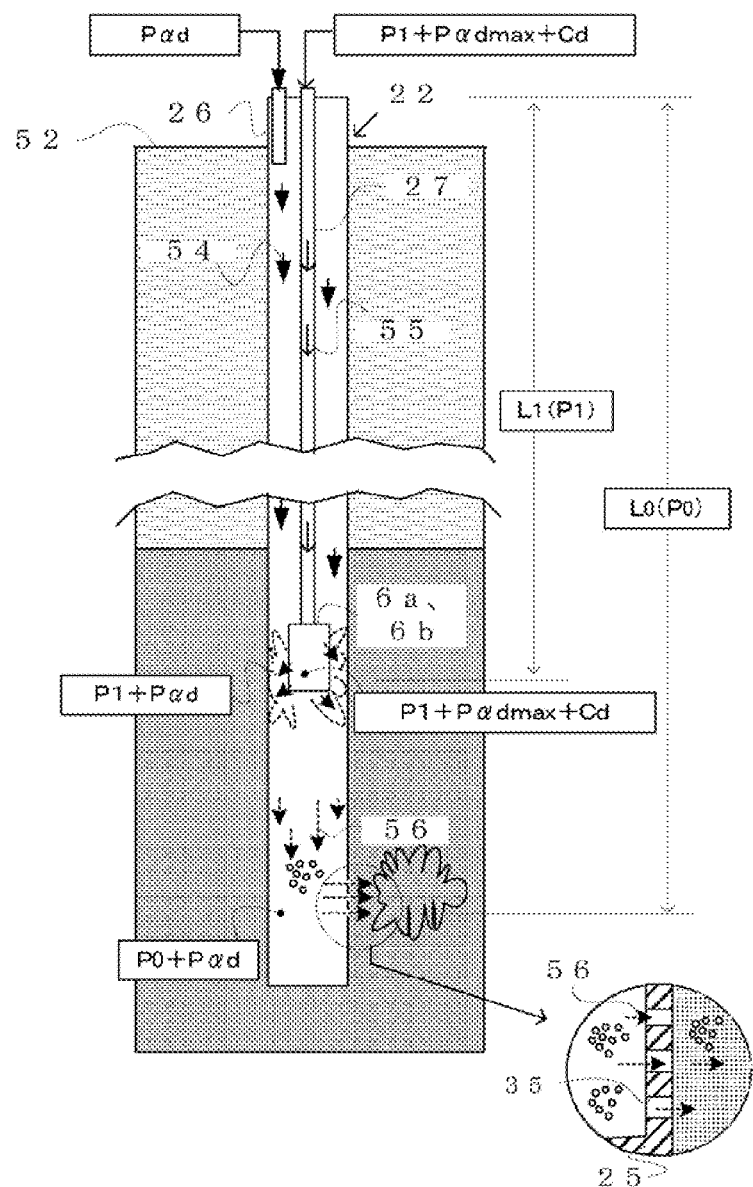
FIG. 6 shows the pressure relationships in a pressure well (Embodiment 1).

FIG. 6 shows the pressure relationship between the injection water and the liquefied carbon-dioxide gas in the injection well. The depth L1 of the fine droplets device 6a or 6b is set such that the hydraulic pressure of the injection water 54 is 7 MPa or more, so as not to change the phase of the liquefied carbon-dioxide gas 55 that is fed to the injection well 22. The hydraulic pressure of the injection well 54 at the depth L1 is designated as P1. Also, the depth to the slits 35 at the bottom of the injection well 22 is designated as L0. The hydraulic pressure at the depth L0 is designated as P0. In the case of the two-liquid mixture 56, it is not necessary to consider pressurization due to hydraulic pressure reduction under the influence of fine bubbles, unlike the situation with a gas-liquid mixture, and therefore the injection pressure of the injection water 54 is designated as $P\alpha d$. From this pressure, the emission pressure of the pressure-injection pump 12 can be decided. The liquefied carbon-dioxide gas 55 is then made to be $P1+P\alpha d+C$, so as to be larger than the pressure of the injection water 54 at the depth L1, where the liquefied carbon-dioxide gas 55 is $P1+P\alpha d$. C is about 10 kg/cm$^2$-30 kg/cm$^2$.

To efficiently inject, under a high-pressure condition, the liquefied carbon-dioxide gas 55 from the injection pipes 41 of the fined droplet devices 6a or 6b to the injection water 54, whose pressure varies, the liquefied carbon-dioxide gas 55 is pulsated, and the fluidity of the liquefied carbon-dioxide gas 55 injected from the injection pipes 41 is heightened, which is a desired effect of the present invention.

Pulsation of the liquefied carbon-dioxide gas 55 controls the cycle and magnitude of pulsation by the low-frequency-pulsation generating device 4a for liquefied carbon-dioxide gas, which is installed between the compressor 23 and the injection well 22. When the pressure of pulsation of the liquefied carbon-dioxide gas 55 is designated as CD, the following relationship is satisfied:

$$7\ \text{MPa} < P1 + P\alpha d\text{max} < P1 + P\alpha d\text{max} + Cd$$

$P\alpha d$max is the maximum pressure of pulsation of the injection water, and $P\alpha d\text{max} < P\alpha + 0.5P\alpha$ is satisfied. To facilitate injection of the liquefied carbon-dioxide gas 55, when the frequency of pulsation is set to 0.5 Hz-30 Hz, and the upper limit of the magnitude (amplitude) of pulsation is set to $0.5P\alpha$, $(Cd - 0.5Cd) < Cd < (Cd + 0.5Cd)$ is satisfied. Depending on the depth L1, Cd is 10 kg/cm$^2$-30 kg/cm$^2$.

FIG. 7 is a flow chart showing the steps of this invention's method for feeding liquefied carbon-dioxide gas into the ground. S70 is a step for pumping up groundwater from a deep aquifer to a water tank on the ground via a pumping well, and then producing injection water. S71 is a step for applying pulsatile hydraulic pressure to the injection water. S72 is a step for feeding injection water, to which pulsatile hydraulic pressure has been applied, from the injection well to the deep aquifer. S73 is a step for feeding liquefied carbon-dioxide gas from a storage tank to the injection well at a pressure at which carbon-dioxide gas is kept in a liquid state. S74 is a step for mixing liquefied carbon-dioxide gas—in the form of fine droplets—with injection water, and thereby generating a mixture of those two liquids. S75 is a step for adjusting the temperature of the injection water. When the temperature is high, it is adjusted downward. S76 is a step for applying pulsation to the liquefied carbon-dioxide gas. The injection status is monitored by a sensor, and pulsation is applied to the liquefied carbon-dioxide gas as needed.

|Industrial Applicability|

Using the present invention's method and this invention's underground feeding device for feeding liquefied carbon-dioxide gas into the ground, liquefied carbon-dioxide gas is mixed with injection water in the form of fine droplets. Therefore, the present invention is suitable for storing carbon dioxide in the ground. Also, the present invention can be applied to the EOR (enhanced [crude-] oil recovery) method, which pressure-injects carbon dioxide into the ground so as to extract crude oil from the ground, and to the EGR (enhanced [natural-] gas recovery) method, which is used to extract natural gas from the ground.

What is claimed is:

1. A method for feeding liquefied carbon-dioxide into the ground, comprising:
   creating injection water by using a pumping well to pump up saline water, from a deep aquifer that is saturated with saline water, to aboveground,
   applying pulsatile hydraulic pressure to the injection water,
   using an injection well to the feed injection water, to which pulsatile hydraulic pressure has been applied, into the deep aquifer,
   feeding liquefied carbon-dioxide, while maintaining said liquefied carbon-dioxide in a liquefied condition, from a storage tank into the injection well, and
   mixing the liquefied carbon-dioxide, in the form of fine droplets comprising droplets having diameters in the range of 0.01 mm to 0.05 mm, with the injection water, thereby generating a mixture of those two liquids.

2. A method, as described in claim 1, for feeding liquefied carbon-dioxide into the ground, and further including applying low-frequency pulsatile hydraulic pressure to the liquefied carbon-dioxide that is fed into the injection well.

3. A method, as described in claim 1, for feeding liquefied carbon-dioxide into the ground, and further including adjusting the temperature of the injection water.

4. An apparatus for feeding liquefied carbon-dioxide into the ground, comprising:
   a device to pump up saline water, from a deep aquifer that is saturated with saline water, to aboveground in order to use the saline water as injection water,
   a high-pressure water-injection device that feeds injection water from an injection well into a deep aquifer,
   a low-frequency-pulse generating device that is provided between the high-pressure water-injection device and the injection well, and that applies pulsatile hydraulic pressure to the injection water, a device that applies pressure so as to feed liquefied carbon-dioxide, while maintaining said liquefied carbon-dioxide in a liquefied condition, from a storage tank into the injection well, and a fine-droplet creating device that is provided inside the injection well and that transforms the liquefied carbon-dioxide that has been fed into the injection well into fine droplets, comprising droplets having diameters in the range of 0.01 mm to 0.05 mm, and mixes the liquefied carbon-dioxide droplets with the injection water, thereby creating a mixture of those two liquids;

and wherein said apparatus's fine-droplet creating device includes:

a casing pipe into which the injection water is fed, an insertion pipe that is inserted into the casing pipe and into which the liquefied carbon-dioxide is fed, such that said insertion pipe is positioned to have a top end and a bottom end, and a rotatable cylinder that is mounted inside and toward the bottom of the insertion pipe, with said rotatable cylinder having inside itself multiple injection pipes that inject the liquefied carbon-dioxide diagonally downward.

5. The apparatus, as described in claim 4, for feeding liquefied carbon-dioxide into the ground, and such that there is provided inside said apparatus's rotatable cylinder a rotor that rotates due to a discharge flow of the liquefied carbon-dioxide.

6. The apparatus, as described in claim 4, for feeding liquefied carbon-dioxide into the ground, and wherein there is provided below the rotatable cylinder a submersible motor that rotates the cylinder.

7. The apparatus, as described in claim 4, for feeding liquefied carbon-dioxide into the ground, with said apparatus further including a low-frequency-pulse generating device that is provided between said device that applies pressure and the injection well, and, that applies pulsatile hydraulic pressure to the liquefied carbon dioxide.

8. The apparatus, as described in claim 4, for feeding liquefied carbon-dioxide into the ground, and further including, between the water tank and the high-pressure water-injection device, a temperature-adjusting device that adjusts the temperature of the injection water.

\* \* \* \* \*